(12) United States Patent
Griffith et al.

(10) Patent No.: US 8,717,681 B2
(45) Date of Patent: May 6, 2014

(54) FLUIDIC LENS

(75) Inventors: Michael S Griffith, Filton (GB); Leslie Charles Laycock, Filton (GB)

(73) Assignee: BAE Systems, plc (GB)

( * ) Notice: Subject to any disclaimer, the term of this patent is extended or adjusted under 35 U.S.C. 154(b) by 1146 days.

(21) Appl. No.: 12/642,505

(22) Filed: Dec. 18, 2009

(65) Prior Publication Data

US 2010/0157438 A1    Jun. 24, 2010

(30) Foreign Application Priority Data

Dec. 18, 2008  (EP) .................................. 08275087
Dec. 18, 2008  (GB) .................................. 0823065.8

(51) Int. Cl.
G02B 3/14 (2006.01)
G02B 1/06 (2006.01)

(52) U.S. Cl.
USPC .......................................... 359/666; 359/665

(58) Field of Classification Search
USPC ................................................. 359/665–667
See application file for complete search history.

(56) References Cited

U.S. PATENT DOCUMENTS

| 6,188,526 B1 * | 2/2001 | Sasaya et al. ................. 359/666 |
| 2002/0118464 A1 | 8/2002 | Nishioka et al. |
| 2007/0127102 A1 | 6/2007 | Obinata |

FOREIGN PATENT DOCUMENTS

| DE | 102007004080 A1 | 8/2008 |
| EP | 1921471 A1 | 4/2007 |
| EP | 1921471 A | 5/2008 |
| JP | 59119301 A | 7/1984 |
| JP | 01140118 A | 6/1989 |
| JP | 02178602 A | 7/1990 |
| JP | 2002243918 A | 2/2001 |
| WO | 2008090986 A1 | 7/2008 |

OTHER PUBLICATIONS

Kowalsky A., See-Through Oled Displays, Light-Emitting Diodes, vol. 6486, (2007).
Bagness M., Variable Focus Liquid Lens, Variable Focus Liquid Lens.
Fuchsel, K., Low Temperature Deposition of Indium Tin Oxide Films by Plasma Ion-Assisted Evaporation, Applied Optics, (2008), vol. 47, No. 13, pp. 297-302.
European Search Report in related application EP08275087 mailed May 14, 2009.

* cited by examiner

Primary Examiner — Scott J Sugarman
(74) Attorney, Agent, or Firm — Finch & Maloney PLLC (57) ABSTRACT

A fluidic lens includes a cavity 16 containing an optically transparent liquid and bounded by optically transparent walls 10, 32 arranged such that light may pass into the fluid via one wall and exit from the fluid via another wall, at least one said wall including at least one optically transparent piezoelectric element which is deformable so as to change the shape of the cavity.

14 Claims, 10 Drawing Sheets

FLUIDIC LENS

CROSS REFERENCE

This application claims the benefit of priority from UK Patent Application No. GB0823065.8 and European Patent Application No. 08275087.8, both of which were filed Dec. 18, 2008 and titled "Fluidic Lens," the entire contents of both of which are hereby incorporated by reference herein.

BACKGROUND OF THE INVENTION

1. Field of the Invention

This invention relates to fluidic lenses and in particular, but not exclusively, lenses for use with light of wavelength in the visible, near infra-red (IR) and in the range 3-5 µm.

2. Description of Related Art

The term "light" as used herein includes infra-red and ultraviolet as well as visible light.

A variable-focus fluidic lens has been described for example in "Variable-focus liquid lens", H. Ren et al, Optics Express Vol. 15, No. 10, 5931-5936, 14 May 2007. The fluidic lens in that case is based upon a pressure-induced liquid redistribution within a lens cell. In this case the liquid used is pure water, but other fluids could be used. However, because of the influence of gravity, there is a tendency for such lenses to sag if their aperture is increased above a few millimetres. In addition, the simple structure of the lens makes it impossible for it to be achromatic in nature (i.e. able to focus parallel rays of different wavelengths to the same point).

SUMMARY OF EMBODIMENTS OF THE INVENTION

One or more embodiments of the invention provides a fluidic lens comprising a cavity containing an optically transparent liquid and bounded by optically transparent walls arranged such that light may pass into the fluid via one said wall and exit from the fluid via another said wall, at least one said wall comprising at least one optically transparent piezoelectric element which is deformable so as to change the shape of the cavity.

The term "liquid" as used herein includes both substances which are permanently liquid at operating temperatures of interest, and substances which are liquid during manufacture of the lens to permit shaping thereof, and which subsequently become solid.

The piezoelectric element may be of monomorph or bimorph construction.

There may be at least one optically transparent electrode for applying an actuating voltage to a said piezoelectric element.

The electrode may be disposed in an optically transparent planarisation layer.

The material of the planarisation layer may have substantially the same refractive index as that of the electrode.

There may be a plurality of electrodes arranged to apply actuating voltages to different areas of the piezoelectric element.

The electrodes may form an array such that each said area of the piezoelectric element has an individually addressable electrode.

The liquid may be conductive and may form an electrode for the piezoelectric element.

The piezoelectric element may be configured to provide plurality of individually deformable sub-elements.

There may be a supporting structure which supports the piezoelectric element at nodes between the sub-elements.

There may be an opening to permit liquid to flow into or out of the cavity when the piezoelectric element is deformed.

The lens may comprise means for maintaining the liquid under pressure.

There may be a pump configured to be driven simultaneously with deformation of the at least one piezoelectric element to assist the flow of liquid.

The pump may be a piezoelectric pump.

The piezoelectric element may be of a single crystal material or PVDF.

One or more embodiments of the invention also provides a compound lens comprising a plurality of lenses as set forth above, a said wall of one lens also forming a said wall of another lens.

These and other aspects of various embodiments of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

BRIEF DESCRIPTION OF THE DRAWINGS

For a better understanding of embodiments of the present invention as well as other objects and further features thereof, reference is made to the following description which is to be used in conjunction with the accompanying drawings, where.

DETAILED DESCRIPTION OF EXEMPLARY EMBODIMENTS OF THE INVENTION

Figure 1A:
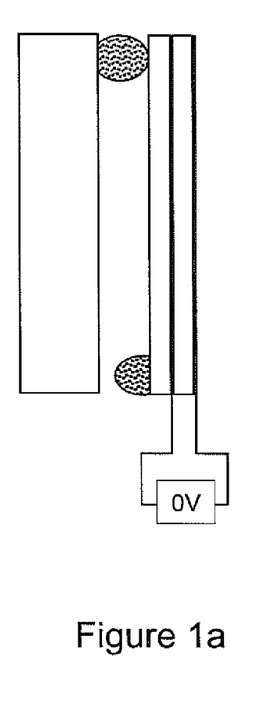
FIGS. 1 and 2 show cross-sections through two convex/concave variable lenses in various operating configurations.

Referring to FIG. 1a, a plano-convex-concave fluidic lens assembly comprises an optically-transparent circular active wall or element 10 bonded to a similarly-transparent passive wall or window 12 by a compliant sealant 14. The area inside the sealant constitutes a cavity 16 which allows for the passage of light through the assembly from the active element 10 to the window 12. The circular active element 10 comprises a transparent piezoelectric single crystal element 18 for example of TRS-X2B material from TRS ceramics, with a transparent conductor (e.g. indium tin oxide (ITO)) 20 deposited on each surface and bonded (with an optically clear epoxy) to an optically transparent passive substrate 22.

The ITO is preferably deposited at a low temperature (e.g. <80° C.) to reduce the risk of affecting the structure of the single crystal material. Deposition of suitable films of ITO has been reported at temperatures as low as 50° C. (see Kevin Fuchsel et al 'Low Temperature deposition of indium tin oxide films by plasma ion-assisted evaporation', Applied Optics Vol 47, No 13, pp C297-C302. May 2008. The compliant sealant 14 is flexible in order to accommodate the bending of the active element 10 while still acting to contain the fluid, and preferably is of silicone rubber, such as Silcoset 105 from ACC Silicones.

The application of an applied voltage from source 24 across the thickness of the single crystal element using the ITO electrodes 20 results in bending of the active element. This in turn will cause displacement of the fluid within the cavity 16. An aperture 26 in the sealant allows the fluid to flow into or out of the optical cavity 16 in response the displacement induced by the bending of the active element 10. The spare fluid is kept in a reservoir 28. The reservoir is an elastic container or accumulator by means of which the liquid is kept under pressure so that it will flow into as well as out of the cavity 16 when required. The flow of liquid can be assisted and the dynamic response improved by means of a pump which conveniently can be a piezoelectric element 30 in the wall of the reservoir 28. This element is driven in antiphase to the element 10 by the voltage source 24 so as to increase the volume of the reservoir 28 when the volume of the cavity 16 is decreased, and vice-versa.

Figure 1B:
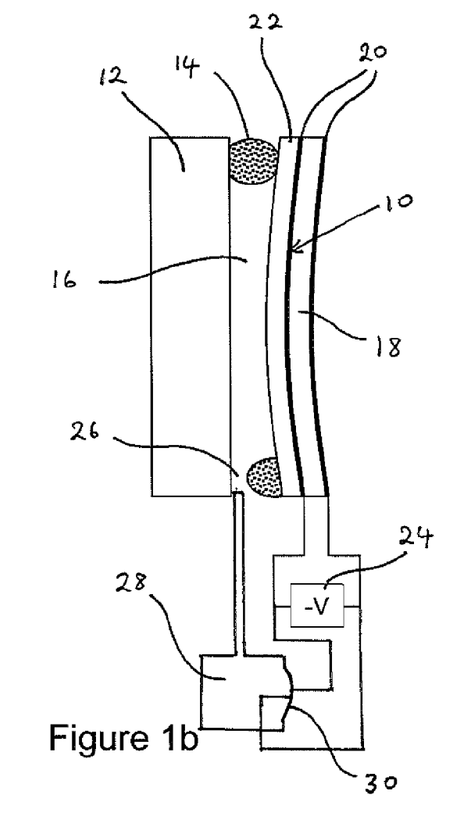
Figure 1C:
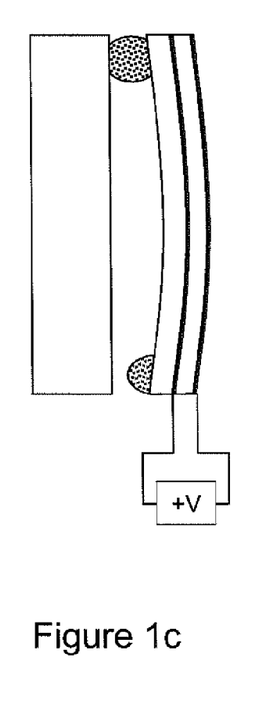

FIG. 1*b* shows the lens with a negative bias applied to make a plano-concave lens with negative focusing power, while FIG. 1*c* shows the lens assembly with a positive bias applied to make a plano-concave lens with positive focusing power.

As with reflective bimorph deformable mirrors, the higher the positive/negative voltage applied to the piezoelectric element, the greater the curvature and hence the higher the focusing power that is induced.

In FIG. 1, the piezoelectric element is on the outside of the structure. However, one or more embodiments of the invention would also work if the piezoelectric element were on the inside. Then, if the liquid is conductive, it may be possible to utilise the liquid itself as one of the electrodes 20 by exposing the surface of the piezoelectric element 18 to it. A further option is to add a transparent encapsulation layer onto the ITO coating to protect the piezoelectric element. Where it is on the outside, the encapsulation may provide a hard durable surface to improve the environmental ruggedness of the lens. If the piezoelectric element faces the liquid, the encapsulation may help to protect the piezoelectric element from the liquid itself, for example if the liquid used has corrosive properties.

While the active element shown in FIG. 1 is a monomorph (i.e. comprising a single layer of poled piezoelectric material), it could equally be a true bimorph or symmetric bimorph structure, with two oppositely-poled piezoelectric layers arranged back-to-back.

Figure 2A:
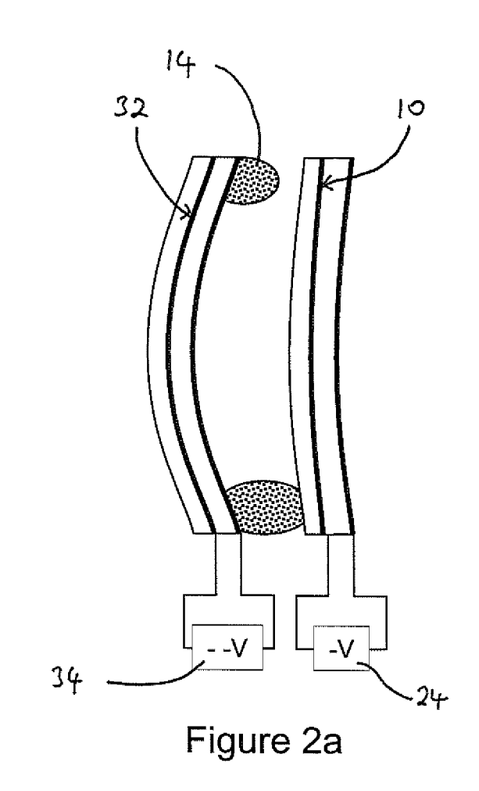
Figure 2B:
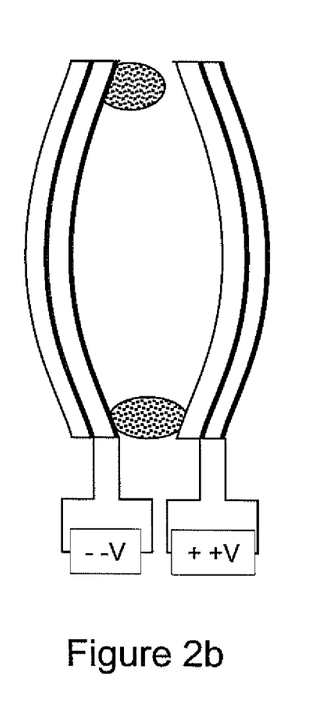
Figure 2C:
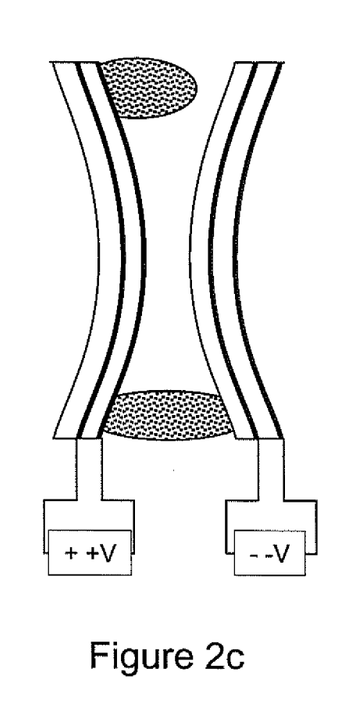

In a further embodiment shown in FIG. 2, the passive window 12 is replaced by another active element 32, driven by a further voltage source 34 which is controlled to operate synchronously and in a defined phase relationship with the source 24. The lens is otherwise as described with reference to FIG. 1. FIG. 2*a* shows the two active elements configured to provide a meniscus lens. FIG. 2*b* shows the two active elements configured to provide a bi-convex lens and FIG. 2*c* shows the two elements configured to provide a bi-concave lens. As illustrated, the degree of curvature of the active element depends on the voltage applied across it.

Compared to the highly flexible membranes used to contain the liquid in conventional fluidic lenses, the active elements 10, 32 are relatively stiff and do not deform significantly except under the influence of an applied voltage. Thus the embodiments so far disclosed can remove the risk of gravitational sag associated with fluidic lenses made with highly flexible membranes.

Figure 3A:
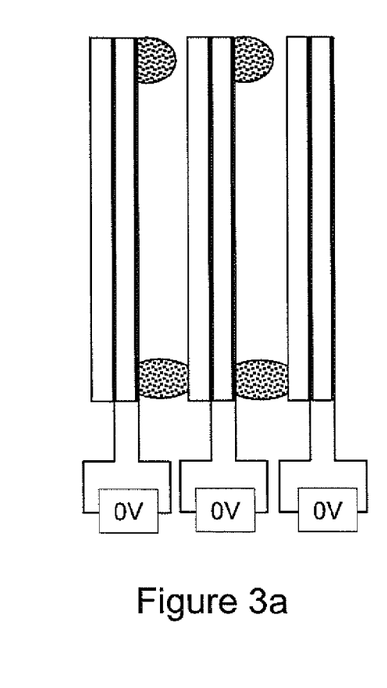
FIGS. 3 and 4 show compound or multi-element lenses in various operative configurations.
Figure 3B:
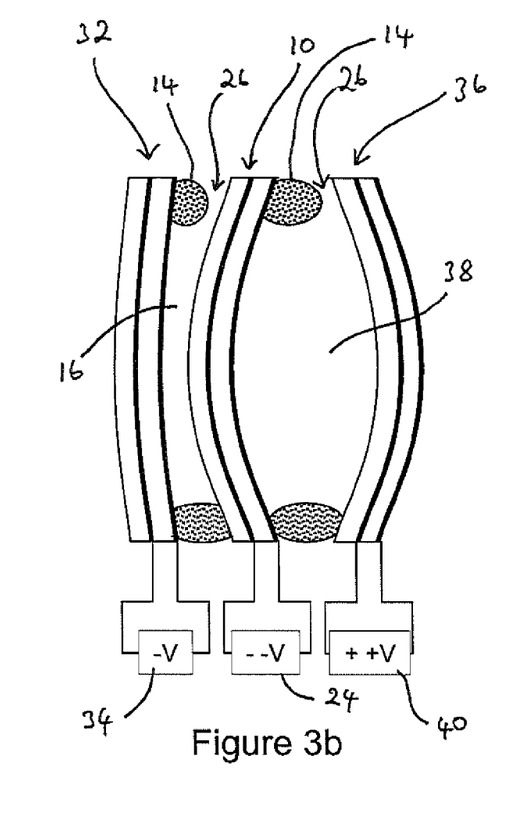
Figure 3C:
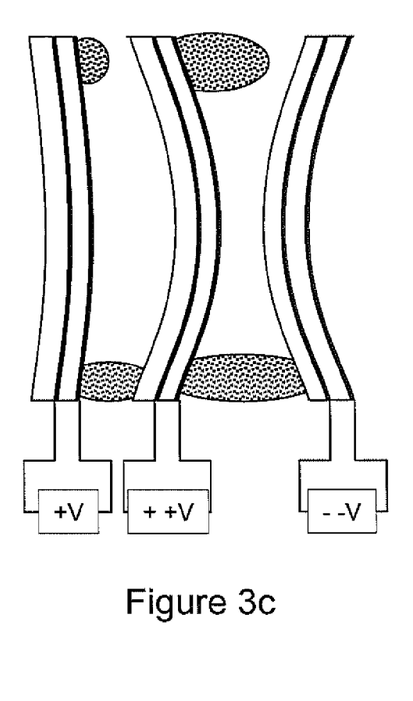

FIG. 3 shows an embodiment with a third active element 36 which together with element 10 defines a second liquid-filled cavity 38, the element 10 being common to cavities 16 and 38. This arrangement enables an achromatic lens with a variable focal length to be realised. FIG. 3*a* shows the lens when inactive with no applied voltages. The fluid in cavity 36 has a low refractive index (similar to that of a 'crown' glass), while the fluid in cavity 16 has a high refractive index (similar to that of a 'flint' glass). The low refractive index liquid can be water (refractive index=1.33), although other refractive index matching liquids are available. This is lower than the lowest crown glass available and potentially gives the liquid achromat an advantage over glass equivalents. High refractive index matching liquids are available, from a number of commercial sources, although those with the very highest index may be toxic. Each of the active elements 10,32, 38 are as described with reference to FIG. 1, and each is driven by respective voltage sources 24, 24, 40 which operate in defined phase relationships with each other.

By modifying the curvature on all three active elements together, the focal length of the lens can be altered while maintaining its achromatic properties.

Figure 4:
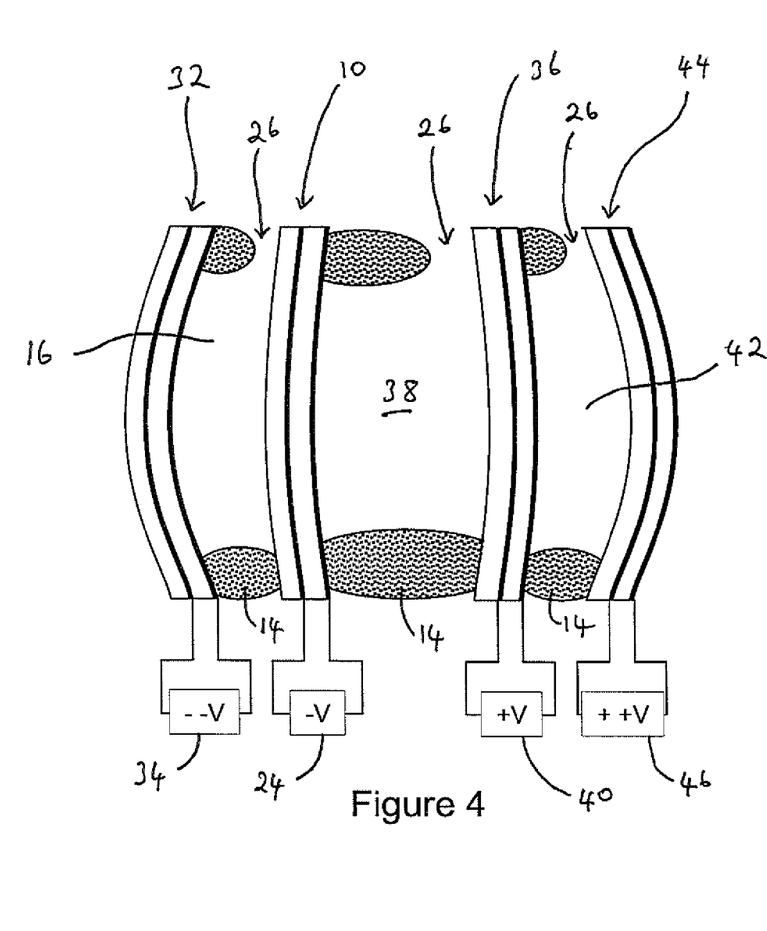

Adding a fourth active element enables more complex lenses to be realised. FIG. 4 shows an embodiment for a Stenheil achromatic triplet having liquid filled cavities 16, 38, 42 defined between active elements 32, 10, 36 and 44 which are driven by commonly-controlled voltage sources 34, 24, 40, 146. In this case the fluid in cavity 38 is of low refractive index (equivalent to 'crown' glass), while the fluid in the outer two cavities 16, 42 will be of a high index type (equivalent to a 'flint' glass).

While the embodiments discussed so far can be achieved with single, continuous ITO electrodes, it may be desirable to divide the electrode structure on one side of the active element into separately controllable segments to enable more complex shapes to be realised. The electrode on the other side will remain common to all segments.

Figure 5:
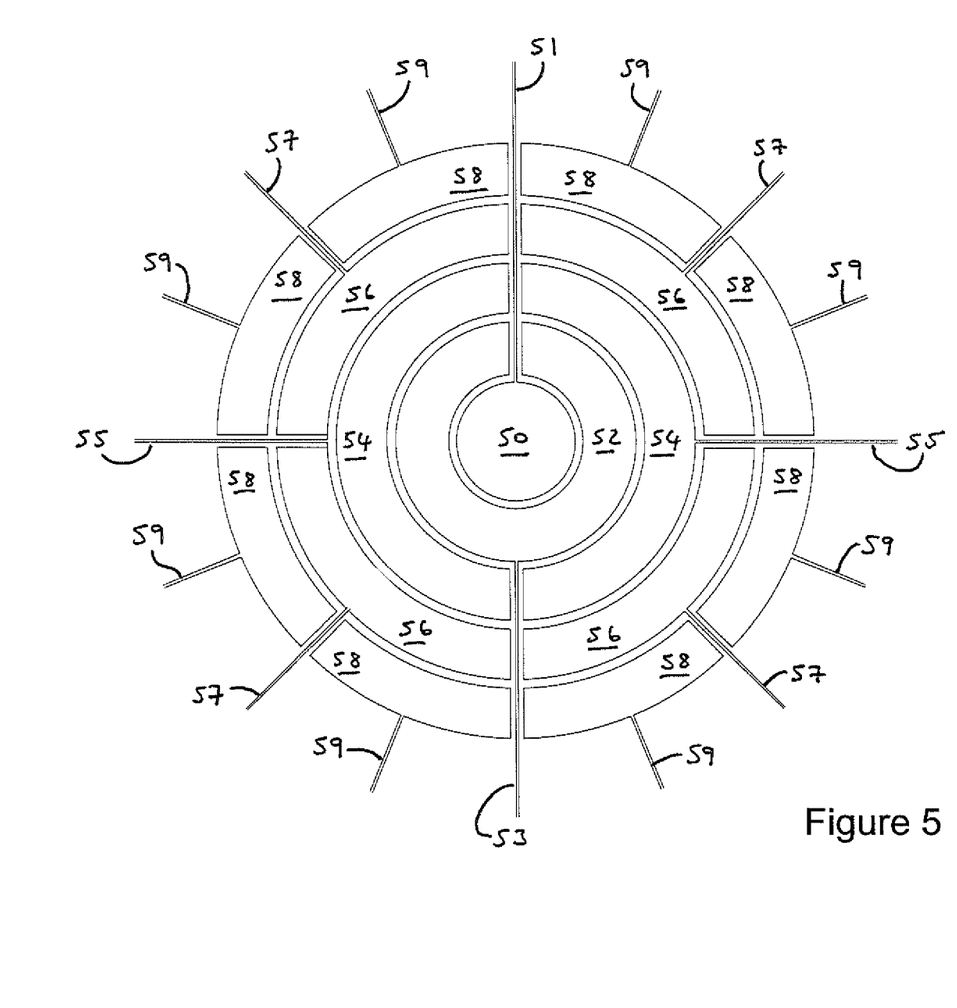
FIG. 5 shows an arrangement of driving electrodes for a fluidic lens.
Figure 6:
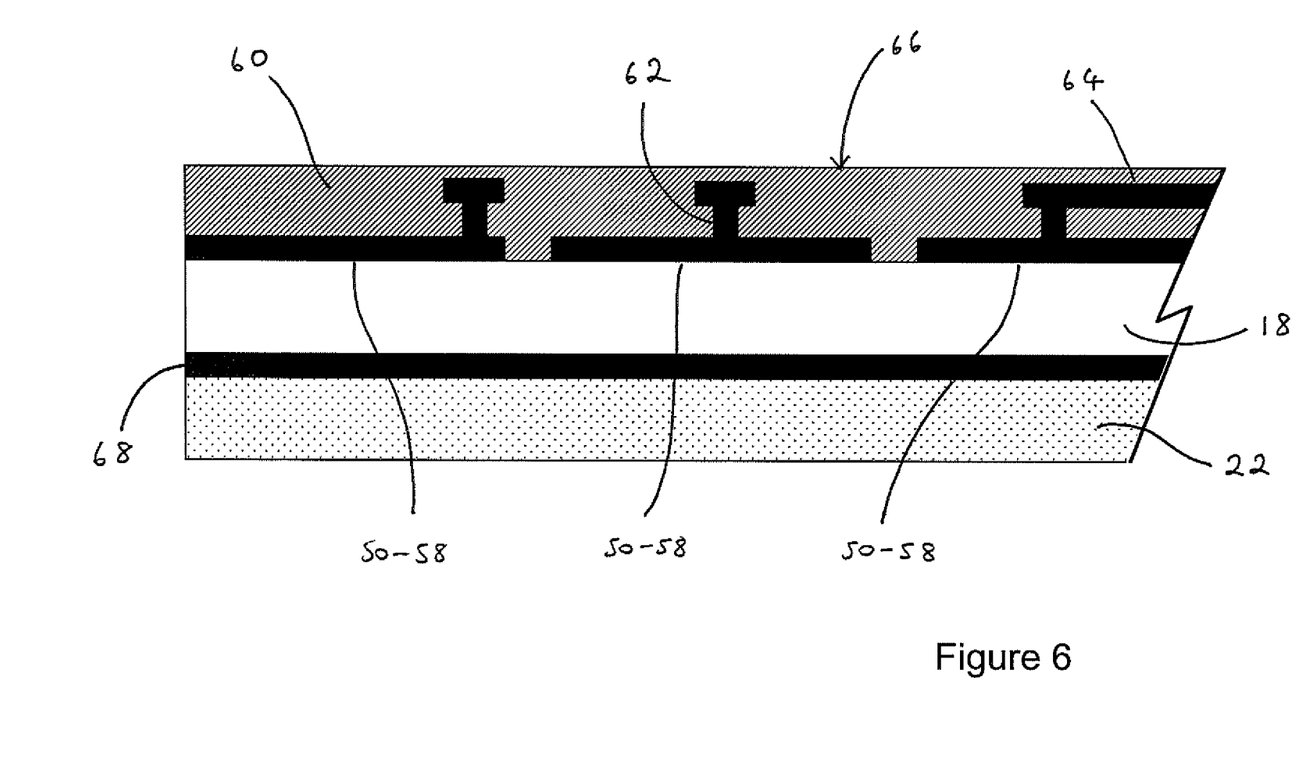
FIG. 6 is a section through part of a fluidic lens.
Figure 7:
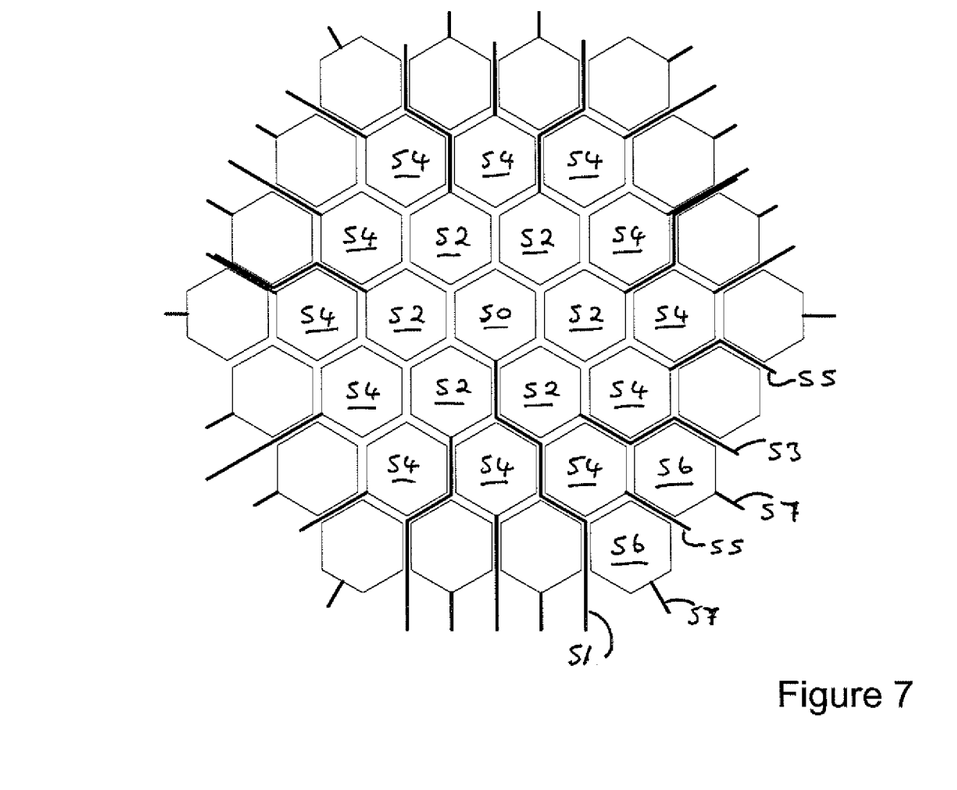
FIG. 7 shows another arrangement of driving electrodes.

Two example patterns are given in FIGS. 5 and 7. FIG. 5 shows a concentric electrode pattern arranged in five bands 50, 52, 54, 56, 58 fed respectively by tracks 51, 53, 55, 57, 59. All bands except the innermost one 50 are interrupted to permit the passage of the tracks to the inner bands. By applying appropriate voltage levels to each band, it is possible to generate a more aspheric shaped lens. If more bands are added, a more accurate and complex aspheric shape can be realised. Each annular band can also be segmented further to increase the complexity of the possible shapes available. However the larger the number of individual electrodes, the larger the surface area within the optical aperture that will be taken up with tracking. Although the electrode material is transparent, nevertheless this will have the net effect of reducing the efficiency of the active element. A way of ameliorating this problem may be to include a transparent insulating dielectric layer 60 over the top of the electrode pattern as shown in FIG. 6. Vias 62 through the dielectric can then be used to connect an individual ITO track 64 running from the periphery to one of the electrodes 50-58. It will be particularly beneficial for the refractive index of the dielectric to match that of the ITO. By adding a further layer of the dielectric 60 over the ITO tracks and polishing the resultant surface 66 flat ("planarising" it), the active element will look uniform and featureless to the incoming light. The common electrode 68 is similarly embedded in the passive substrate 22, the rear face of which also is planarised so as to be optically flat the planarisation process as used in the manufacture of active matrix backplanes for displays may be utilised to realise the embodiment of FIG. 6. Alternatively the electrode may be deposited on the surface of the substrate 22 as a continuous conformal layer. Then planarisation may not be necessary.

A further electrode structure is shown in FIG. 7, in which hexagonal electrodes are arranged in a close-packed pattern. Again, while the figure shows tracks routed through the electrode structure to the periphery of the element, a planarisation process could be implemented as in FIG. 6 to enable more efficient connection and to render the element optically uniform. The hexagonal elements can be actuated in concentric bands, and some of them and their associated feeds have been numbered correspondingly to FIG. 6 to illustrate this.

Figure 8A:
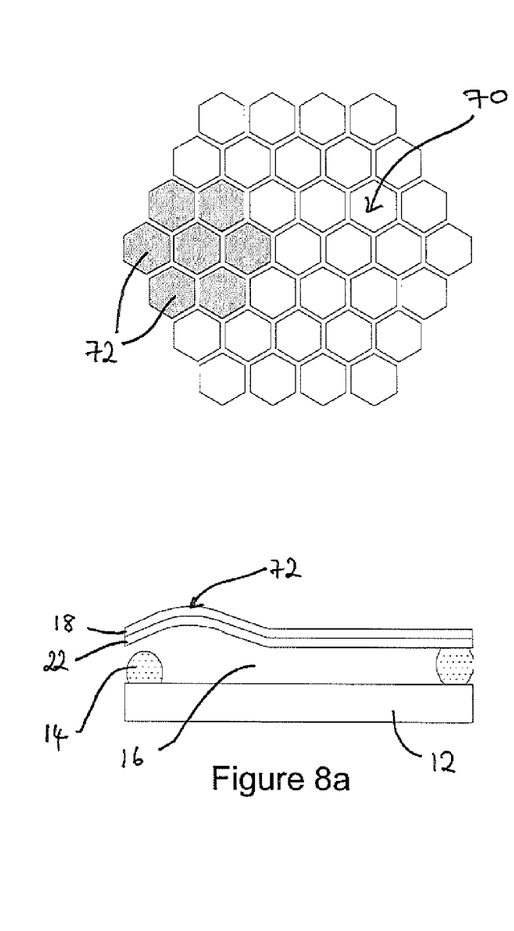
FIG. 8 shows plan and sectional views of another fluidic lens, in various operating configurations.
Figure 8B:
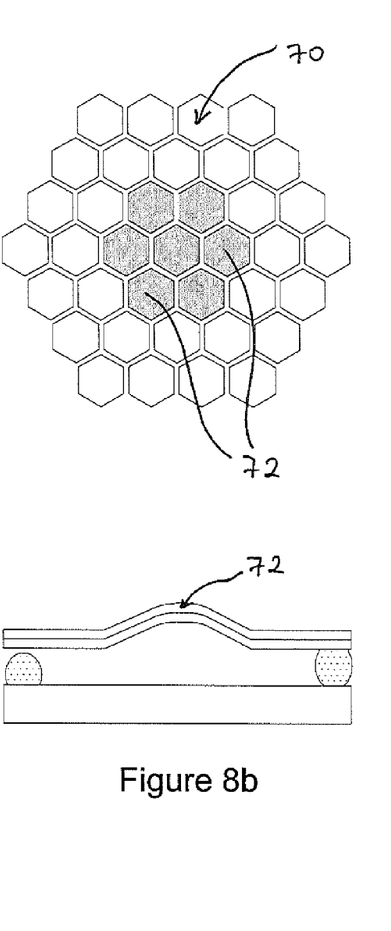
Figure 8C:
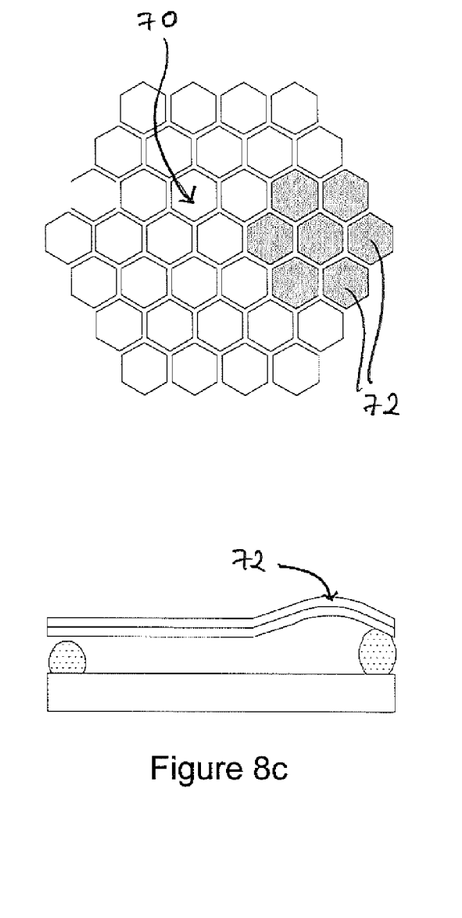

The electrode pattern of FIG. 7 is well suited for the implementation of a fluidic lens as a programmable lens element. As can be seen from FIG. 8, a hexagonal electrode structure 70 can be addressed selectively to provide a localised area 72 with higher focusing power which can be moved across the activated element. This capability is particularly of benefit where visibility of a wide field is required.

The multi-element device can also be used as an active optic to correct for static aberrations, for instance, in an assembled system. An iterative algorithm can be used in conjunction with a fitness parameter to adjust the programmable lens element to provide an optimised shape. The fitness parameter could be as simple as a pinhole; in this case the iterative search algorithm would be used to maximise the optical power reaching a power meter placed directly behind the pinhole. In another example, if the optical assembly is required to deliver a collimated beam with a flat wavefront, a feedback control loop could use the information from a wavefront sensor to determine the optimum correction required.

Lenses according to one or more embodiments of the invention can also be used for eyesight correction. Simple fluid lenses are already targeted at this application, but one or more of the programmable embodiments of this invention will enable more complex conditions to be corrected.

For such 'active optic' applications, once the optimum lens shape has been determined, it may be useful to fix that shape permanently. In this instance, there are a number of options that could be used. These include:

Using as the liquid in the lens cavity a low viscosity two part epoxy which has a suitable working life (e.g. greater than thirty minutes). The correct voltages would be applied while the epoxy is setting.

Using as the liquid a low viscosity UV curing epoxy: this can be set instantly once the optimum shape has been achieved. There are a wide range of epoxies available with a range of viscosities and a range of refractive indexes.

The ability to set the shape (especially a complex one) during manufacture in general is of benefit. A specific prescription can be catered for without incurring non-recoverable engineering costs.

Another use for a fluidic lens according to one or more embodiments of the invention is as a programmable phase plate for adaptive optics. For this application the device would typically be used in transmission and a wavefront sensor would be used to provide feedback to a control interface.

Figure 9:
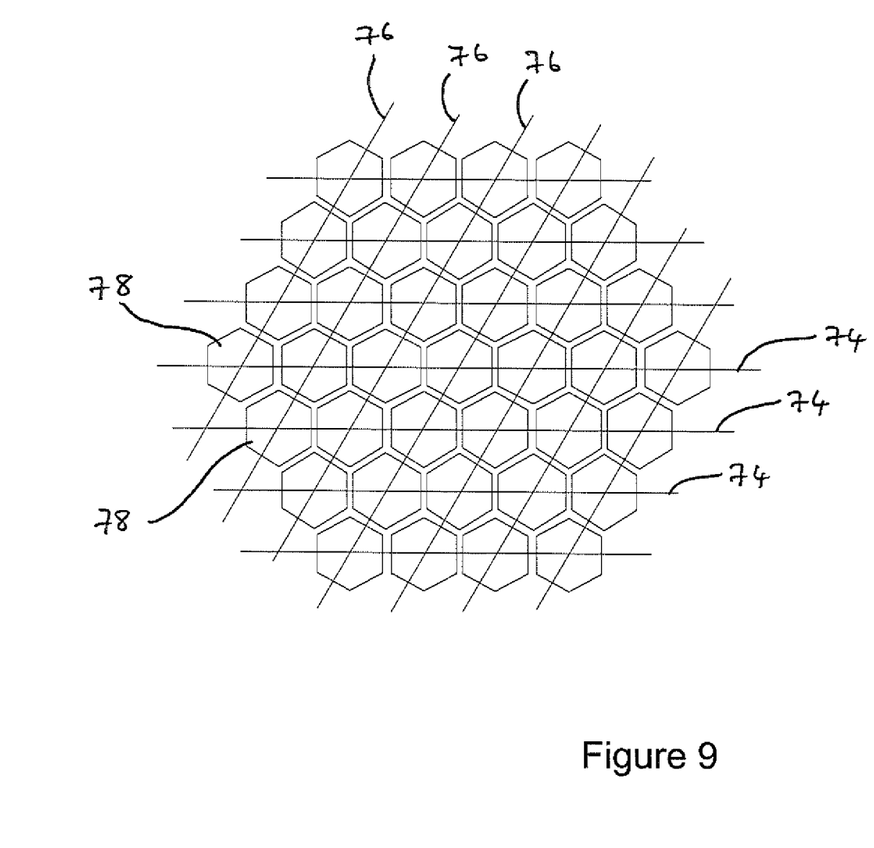
FIG. 9 shows a further arrangement of driving electrodes.

These systems can either be used with open loop control (where the information from the wavefront sensor is analysed to determine the required voltages to apply to the wavefront corrector) or in closed loop control. One example is where the wavefront sensor is placed after the wavefront corrector, and the closed loop is used to minimise the spot (local) deviation on the wavefront sensor. The wavefront coming off the corrector then will have been flattened. Astronomy applications often require high order correctors with up to thousands of elements. For these numbers of electrodes, passive addressing is no longer viable. In this instance it may be possible to use a transparent active matrix to address the lens elements. This technology is currently undergoing development for transparent OLED (organic light emitting diode) displays as described in W. Kowalsky et al, 'See-through OLED Displays'. SPIE Vol 6486, 64860F-1. In a hexagonal active matrix, shown in FIG. 9, valid information for a specific 'row' 74 is loaded onto the 'columns' 76 through a shift register. Once all the information is loaded, the 'row' is then enabled and respective transparent transistors at each electrode 78 hold the information until that 'row' is addressed again.

The multi-element fluid lens as disclosed may also enable other types of achromatic lens to be realised. For instance, it will be possible to realise an achromatic meniscus lens or an achromatic aspheric lens as long as the curvatures required are within the capabilities of the active elements used.

In selecting a suitable liquid for use in a fluidic lens, besides having high optical transmission over the required range of wavelengths, various other criteria should be considered. For example, the liquid should have low viscosity to enhance its dynamic behaviour, remain in the liquid state throughout a required operational temperature range (unless it is to be solidified after shaping e.g. as for the epoxy versions discussed above), be chemically insert and stable and have a high refractive index to enhance optical power at a given lens surface curvature. Furthermore, preferred substances should not be toxic, nor exhibit absorption bands in the wavelength region of interest.

While most of the discussion has been centred on operation with visible light, the single crystal piezoelectric element will also enable operation in the near infra-red and the 3-5 μm range. A list of the desirable properties for a liquid suited to use with an IR fluidic lens has been presented in our GB Patent Application No GB 0814933.8 (unpublished at the date of filing of this application) the disclosure of which is incorporated herein by reference. Those liquids found to be suitable include certain fluorocarbon compounds, in particular $C_6F_{10}(CF_3)_2$ (Perfluoro-1,3-dimethylcyclohexane), $C_{10}F_{18}$ (Perfluorodecaline) and $CF_3(CF_2)_6CF_3$ (Perfluorooctane). Each of these compounds has been selected in particular for its high level of transmission of light of wavelengths in the 3-5 μm range. These compounds are also highly stable, inert, hydrophobic and non-toxic (finding use in many medical applications), although their refractive index is relatively low.

The refractive index of ITO is fairly high and may be a good match to that of the single crystal piezoelectric material in the 1 μm region. This offers the possibility of depositing a λ/4 thick coating (e.g. 250 nm) of the ITO to act as both a transparent conductor and as an anti-reflection coating. While the transmission of ITO is low in the 3-5 μm range, operation will still be possible by using a thinner, more resistive coating. Because the capacitance of the piezoelectric element will be low (e.g. order of ~40 nF for a 20 mm diameter element), the sheet resistance of the ITO could be as high as 1000 ohms/square before the RC time constant starts to approach the response speed determined by the mechanical properties of the lens assembly such as the fluid viscosity and the thickness of the active element.

Preferably, when filling the cavity with the liquid, a second small aperture is used for the filling procedure; one aperture is used to feed the liquid into the main cavity whilst the other aperture acts as a bleed (air outlet) and reduces the risk of air being trapped in the system.

Figure 10A:
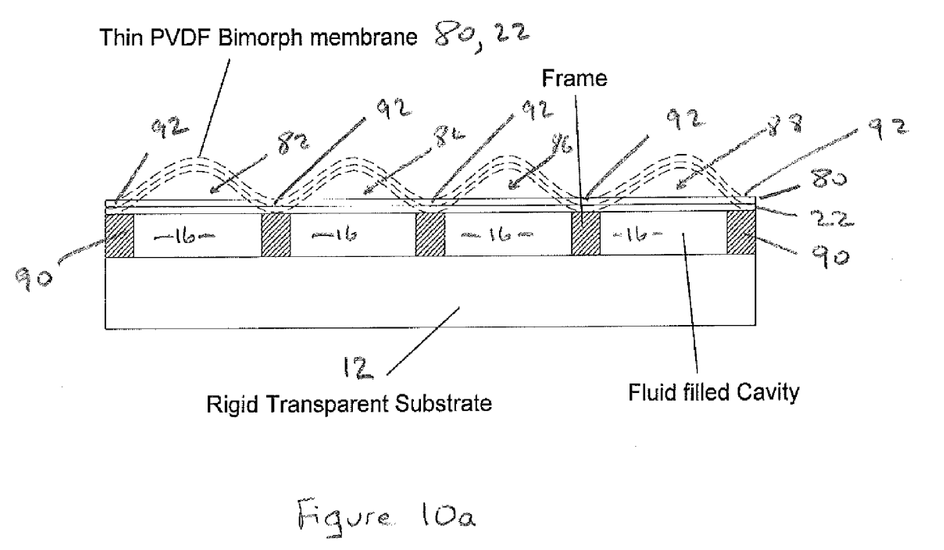
FIGS. 10a and 10b are sections through further fluidic lenses.
Figure 10B:
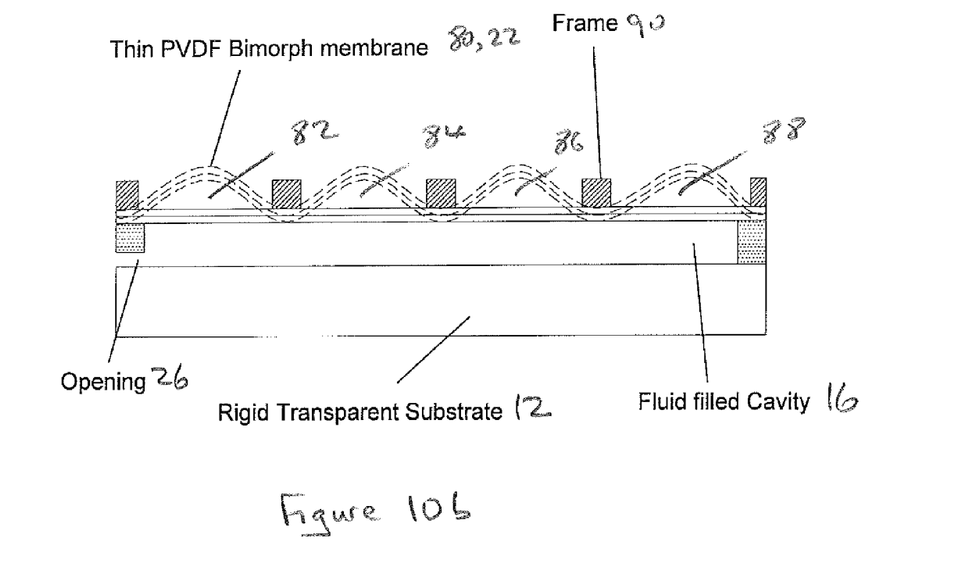

Whilst all the embodiments discussed so far employ single crystal transparent piezoelectric materials, polyinylidene fluoride (PVDF) is a transparent piezoelectric polymer which can also be used to make active monomorph or bimorph elements for fluidic lenses. In this case, the films are typically very thin, and would suffer from the same gravitational sag issues as membrane fluid lenses if they were of a comparable size. However, FIG. 10 shows one advantageous implementation where a PVDF bimorph sheet 80 is used to form an array of controllable fluidic microlenses 82, 84, 86, 88 which may be for example of between 100 μm and 2 mm in diameter. The bimorph sheet is bonded to a frame 90 (this may or may not be optically transparent depending on the application) which is mounted on the rigid transparent window 12. The fluid fills the cavities 16 defined generated by the frame. Openings in the frame (not shown) connect all the cavities together such that the fluid can run freely in between, and a reservoir outside the optical aperture enables the fluid to pass into and out of the cavity structure as previously described. Where the PVDF has a continuous electrode, applying a voltage to the active element will activate all the microlenses together to deform them between an inactive position shown in solid lines and an active position shown in dotted lines. The attachment points 92 of the PVDF to the frame form a series of fixed boundaries (nodes) between the microlenses.

The frame 90 which supports the PVDF active element and defines the microlens size may alternatively hold the PVDF film from above as shown in FIG. 10. In this case there then is a single cavity 16 underneath the PVDF bimorph 80, 22. Again, the response time of the microlenses array may be improved by coordinating a pump with the active element.

It also is possible to generate an array of programmable micro-lenses by using a transparent active matrix to address the microlenses of FIG. 10 individually.

The fluidic lenses of one or more embodiments of the present invention may be used in association with a lens of fixed focal length such that the fluidic lens provides auxiliary focus control for the fixed lens. In addition, two or more fluidic lenses may be used together to provide a compound lens assembly. One of the fluidic lenses may be of the membrane type disclosed in GB 0814933.8.

It will be appreciated that various alterations, modifications, and/or additions may be introduced into the constructions and arrangements of parts described above without departing from the scope of the present invention as defined in the appended claims.

The invention includes any novel features or combination of features herein disclosed whether or not specifically claimed. The foregoing illustrated embodiments are provided to illustrate the structural and functional principles of the present invention and are not intended to be limiting. To the contrary, the principles of the present invention are intended to encompass any and all changes, alterations and/or substitutions within the spirit and scope of the following claims.

What is claimed is:

1. A fluidic lens comprising a cavity containing an optically transparent liquid and bounded by optically transparent walls arranged such that light may pass into the fluid via one said wall and exit from the fluid via another said wall, at least one said wall comprising at least one optically transparent piezoelectric element which is deformable so as to change the shape of the cavity, and wherein the at least one piezoelectric element is of a single crystal material.

2. A lens as in claim 1, comprising at least one optically transparent electrode for applying an actuating voltage to a said piezoelectric element.

3. A lens as in claim 2, wherein the electrode is disposed m an optically transparent planarisation layer.

4. A lens as in claim 3, wherein the material of the planarisation layer has substantially the same refractive index as that of the electrode.

5. A lens as in claim 1, comprising a plurality of electrodes arranged at the surface of the piezoelectric element to apply actuating voltages to different areas of the piezoelectric element.

6. A lens as in claim 5, wherein the electrodes form an array such that each said area of the piezoelectric element has individually addressable electrodes.

7. A lens as in claim 1, wherein the liquid is conductive and forms an electrode for the piezoelectric element.

8. A lens as in claim 1, wherein the piezoelectric element is configured to provide a plurality of individually-deformable sub-elements.

9. A lens as in claim 8, comprising a supporting structure which supports the piezoelectric element at nodes between the sub-elements.

10. A lens as in claim 1, comprising an opening to permit liquid to flow into or out of the cavity when the piezoelectric element is deformed.

11. A lens as in claim 10, comprising means for maintaining the liquid under pressure.

12. A lens as in claim 10, comprising a pump configured to be driven simultaneously with deformation of the at least one piezoelectric element to assist the flow of liquid.

13. A lens as in claim 12, wherein the pump is a piezoelectric pump.

14. A compound lens comprising a plurality of lenses as claimed in claim 1, a said wall of one lens also forming a said wall of another lens, thereby enabling an achromatic lens with a variable focal length to be realized.

* * * * *